United States Patent
Zang et al.

(10) Patent No.: US 12,305,291 B2
(45) Date of Patent: May 20, 2025

(54) SUPER-HYDROPHOBIC MANGANESE DIOXIDE COATING ON METALLIC MATERIAL SURFACES

(71) Applicant: East China Jiaotong University, Jiangxi (CN)

(72) Inventors: Dongmian Zang, Jiangxi (CN); Xiaowei Xun, Jiangxi (CN); Jiaojiao Dong, Jiangxi (CN); Ting Pan, Jiangxi (CN)

(73) Assignee: East China Jiaotong University, Nanchang (CN)

( * ) Notice: Subject to any disclaimer, the term of this patent is extended or adjusted under 35 U.S.C. 154(b) by 955 days.

(21) Appl. No.: 17/397,908

(22) Filed: Aug. 9, 2021

(65) Prior Publication Data

US 2021/0363644 A1    Nov. 25, 2021

Related U.S. Application Data

(63) Continuation-in-part of application No. 16/528,386, filed on Jul. 31, 2019, now Pat. No. 11,118,063.

(30) Foreign Application Priority Data

Jan. 11, 2019  (CN) .......................... 201910030002.8

(51) Int. Cl.
| | |
|---|---|
| *C23C 22/83* | (2006.01) |
| *C09D 1/00* | (2006.01) |
| *C09D 5/16* | (2006.01) |
| *C09D 7/40* | (2018.01) |
| *C09D 7/61* | (2018.01) |
| *C23C 22/48* | (2006.01) |

(52) U.S. Cl.
CPC ................ *C23C 22/83* (2013.01); *C09D 1/00* (2013.01); *C09D 5/1681* (2013.01); *C09D 5/1687* (2013.01); *C09D 7/61* (2018.01); *C09D 7/70* (2018.01); *C23C 22/48* (2013.01)

(58) Field of Classification Search
None
See application file for complete search history.

(56) References Cited

FOREIGN PATENT DOCUMENTS

| | | |
|---|---|---|
| CN | 101054194 A | 10/2007 |
| CN | 106119842 A | 11/2016 |
| CN | 107215901 A | 9/2017 |
| CN | 107740091 B | 8/2018 |
| CN | 108704489 A | 10/2018 |
| IN | 108315793 A | 7/2018 |
| JP | 2011183526 A | 9/2011 |

(Continued)

OTHER PUBLICATIONS

He et al., CN 10774091, English Translation (Year: 2018).*

(Continued)

*Primary Examiner* — Colin W. Slifka

(57) ABSTRACT

This disclosure discloses a durable super-hydrophobic manganese dioxide coating, belonging to the field of metallic material surface treatment. The super-hydrophobic manganese dioxide coating includes manganese dioxide microspheres and a stearic acid shell. The manganese dioxide microspheres are encased in the stearic acid shell. The manganese dioxide microspheres are stacked hierarchically on the metallic material surface.

5 Claims, 10 Drawing Sheets

(56) References Cited

FOREIGN PATENT DOCUMENTS

| WO | WO-2008098069 A1 | * | 8/2008 | ............. B82Y 30/00 |
| WO | WO-2016189519 A1 | * | 12/2016 | ........... B05B 7/1481 |

OTHER PUBLICATIONS

Li Jiahuan. "Preparation and Properties of Superhydrophobic and Super Slippery Coating on Mg Alloy Surface." China's Excellent Master's Thesis Full-text Database Engineering Science and Technology Series I. Jun. 15, 2018. Main text pp. 37-38.

* cited by examiner

SUPER-HYDROPHOBIC MANGANESE DIOXIDE COATING ON METALLIC MATERIAL SURFACES

CROSS-REFERENCE TO RELATED APPLICATIONS

This application is a continuation-in-part application of U.S. patent application Ser. No. 16/528,386, filed on Jul. 31, 2019, now U.S. Pat. No. 11,118,063, which claims the benefit of priority from Chinese Patent Application No. 201910030002.8, filed on Jan. 11, 2019. The content of the aforementioned application, including any intervening amendments thereto, is incorporated herein by reference in its entirety.

TECHNICAL FIELD

The present invention relates to the field of metallic material surface treatment, and in particular to a durable super-hydrophobic manganese dioxide coating on a metallic material surface.

BACKGROUND

Super-hydrophobic surfaces have been widely applied in research of metallic material surfaces due to their good self-cleaning, corrosion resistance, antifouling and antibacterial properties. In the prior art, there are two strategies well known to prepare a super-hydrophobic surface: (1) roughening the hydrophobic substrates; and (2) modifying the textured surfaces with low-surface-energy materials. At present, as methods for preparing a super-hydrophobic surface, etching, electrochemical deposition, template-based preparation, electrispinning, sol-gel, anodic oxidation, micro-arc oxidation, dealloying and the like may be used. Those methods requirement special experimental facilities and complex techniques, resulting in limited applications.

As an important functional material, manganese dioxide has good physical and chemical stability and has been widely applied in fields such as catalytic and electrode materials. At present, Mn (II) is usually used as a precursor to create manganese dioxide with the involvement of strong oxidants such as potassium persulfate, potassium permanganate, or electrochemical oxidation. In the present invention, a super-hydrophobic manganese dioxide coating is generated on a metallic material surface by simple and convenient solution immersion, using oxygen in the air as the oxidant.

SUMMARY

An objective of the present invention is to provide a super-hydrophobic manganese dioxide coating on a metallic material surface, which has exceptional self-cleaning performance and excellent mechanochemical durability in a series of harsh mechanical and chemical conditions.

Technical solutions of this application are described as follows.

This application provides a durable super-hydrophobic manganese dioxide coating on a surface of a metallic material, comprising:
manganese dioxide microspheres; and
a stearic acid shell;
wherein the manganese dioxide microspheres are encased in the stearic acid shell; and
the manganese dioxide microspheres are stacked hierarchically on the metallic material surface.

In some embodiments, an average diameter of the manganese dioxide microspheres is 3-7 µm, and a space between two adjacent manganese dioxide microspheres is 1.5-2.5 µm.

In some embodiments, nanosized cavities and islands are formed on the manganese dioxide microspheres.

In some embodiments, the super-hydrophobic manganese dioxide coating has a thickness of 80-90 µm.

In some embodiments, the super-hydrophobic manganese dioxide coating is prepared through steps of:
(1) soaking the metallic material in a water-soluble manganese salt solution followed by clean and drying to obtain a manganese dioxide coating on the metallic material; and
(2) dissolving stearic acid in an organic solvent to obtain a stearic acid solution; and soaking the treated metallic material in the step (1) in the stearic acid solution followed by cleaning and drying to obtain the super-hydrophobic manganese dioxide coating on the surface of the metallic material.

In some embodiments, the water-soluble manganese salt is manganese sulfate; the water-soluble manganese salt solution has a concentration of 0.01-0.1 mol/L; and the organic solvent is anhydrous ethanol.

The present disclosure has the following technical effects.

In the present disclosure, based on the surface activity and the property of interface reaction of a metallic material, manganese dioxide is deposited on a metallic material surface by simple and convenient solution immersion: $2M+nMn^{2+}+2nH_2O=2M^{n+}+nH_2+nMn(OH)_2$, $2Mn(OH)_2+O_2=2MnO_2 \cdot H_2O$, where $Mn^{2+}$ has a hydrolysis reaction on the metallic material surface to generate $Mn(OH)_2$ which is then oxidized by oxygen in the air to generate a manganese dioxide coating. The stearic acid becomes negatively charged stearate ions after deprotonation in the solution. The stable chemical bonding of the stearate ions to the manganese dioxide coating on the metallic material surface enables the coating to have super-hydrophobicity. The water contact angle of the coating is greater than 150°. Such a super-hydrophobic coating may be prepared on the metallic material surfaces, such as magnesium alloy, stainless steel and cast iron surfaces.

Manganese dioxide has complex crystal structures, including one-dimensional, two-dimensional and three-dimensional tunnel structures with nanochannels, formed by connecting basic units $MnO_6$ in different ways. Due to its special structure, manganese dioxide may be bonded more stably to the stearate ions on the metallic material surface, thereby enabling the coating to have durable super-hydrophobicity.

The coating provided herein has simple and cost-effectiveness preparation process. Moreover, this coating also offers exceptional self-cleaning performance and excellent mechanochemical durability under a series of harsh mechanical and chemical conditions, having a broad application prospect.

BRIEF DESCRIPTION OF THE DRAWINGS

This disclosure will be described below in detail with reference to the accompanying drawings.

DETAILED DESCRIPTION OF EMBODIMENTS

Figure 1:
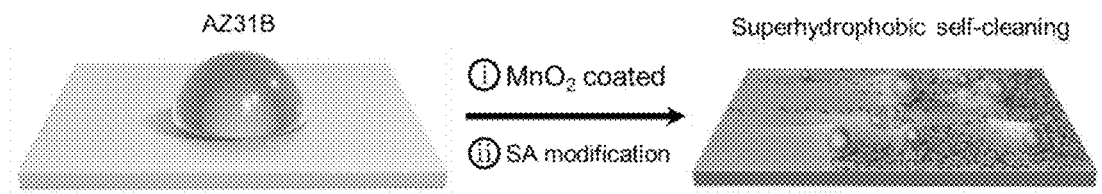
FIG. 1 schematically illustrates a preparation of a super-hydrophobic manganese dioxide coating on an AZ31B Mg alloy.

The technical solutions in embodiments of the present disclosure will be clearly and completely described below in combination with the embodiments. Apparently, the embodiments described herein are some but not all of the embodiments of the present disclosure. All other embodiments obtained by a person of ordinary skill in the art on the basis of the embodiments in the present disclosure, without paying any creative effort, shall fall into the protection scope of the present disclosure.

The term "super-hydrophobic", as used here, means super hydrophobicity or the formation of the super hydrophobic property. That is, it is quite difficult to wet. The concept of using a stable contact angle formed by liquid drops on a solid substrate surface as a quantitative measurement of wetting ability of a specific solid is also well known. Wetting is an ability of the liquid in maintaining surface contact with the solid due to the intermolecular interaction, when the liquid comes into contact with the solid surface. The degree of wetting (wettability) is determined by the balance between adhesion and cohesion. It is usually considered that it is hydrophobic, if the stable contact angle between the water drops and the substrate surface is greater than 90°. For example, for water on paraffin, the stable contact angle is about 107°. Many applications require a hydrophobic coating having a great stable contact angle of at least 150°. Such a coating is referred to as super-hydrophobic coating.

EXAMPLE 1

In the first step, the metallic material is cut, the cut metallic material is mechanically polished successively with 400 #, 800 #, 1200 #, 2000 #SiC paper until the metallic material becomes smooth and flat, then the polished metallic material is cleaned successively with acetone, anhydrous ethanol and deionized water for 5 minutes to remove impurities and stains on the surface of the polished metallic material, and then dried for future use;

in the second step, 2.1128 g manganese sulfate is dissolved in 250 mL deionized water to obtain a solution of manganese sulfate, and the pretreated metallic material in the first step is soaked in the prepared solution of manganese sulfate, kept standing for 4 hours, taken out when bubbles on the metallic material surface are reduced, cleaned with deionized water, and dried; and in the third step, 0.7112 g stearic acid is dissolved in 250 mL anhydrous ethanol to obtain a solution of stearic acid, and the pretreated metallic material with a manganese dioxide coating in the second step is soaked in the solution of stearic acid, taken out after standing for 6 hours, cleaned with anhydrous ethanol, and then dried for 5 hours at 60-80° C. to obtain a super-hydrophobic manganese dioxide coating. It is measured that the obtained super-hydrophobic manganese dioxide coating has a static contact angle of 158.4° and a roll angle of 7.6°.

EXAMPLE 2

In the first step, the metallic material is cut, the cut metallic material is mechanically polished successively with 400 #, 800 #, 1200 #, 2000 #SiC paper until the metallic material becomes smooth and flat, then the polished metallic material is cleaned successively with acetone, anhydrous ethanol and deionized water for 5 minutes to remove impurities and stains on the surface of the polished metallic material, and then dried for future use;

in the second step, 2.1128 g manganese sulfate is dissolved in 250 mL deionized water to obtain a solution of manganese sulfate, and the pretreated metallic material in the first step is soaked in the prepared solution of manganese sulfate, kept standing for 6 hours, taken out when bubbles on the metallic material surface are reduced, cleaned with deionized water, and dried; and in the third step, 1.4224 g stearic acid is dissolved in 250 mL of anhydrous ethanol to obtain a solution of stearic acid, and the pretreated metallic material with a manganese dioxide coating in the second step is soaked in the solution of stearic acid, taken out after standing for 5 hours, cleaned with anhydrous ethanol, and then dried for 4 hours at 60-80° C. to obtain a super-hydrophobic manganese dioxide coating. It is measured that the obtained super-hydrophobic manganese dioxide coating has a static contact angle of 162° and a roll angle of 8.2°.

The metallic material is AZ31B Mg alloy.

EXAMPLE 3

In the first step, the metallic material is cut, the cut metallic material is mechanically polished successively with 400 #, 800 #, 1200 #, 2000 #SiC paper until the metallic material becomes smooth and flat, then the polished metallic material is cleaned successively with acetone, anhydrous ethanol and deionized water for 5 minutes to remove impurities and stains on the surface of the polished metallic material, and then dried for future use;

in the second step, 4.2255 g manganese sulfate is dissolved in 250 mL deionized water to obtain a solution of manganese sulfate, and the pretreated metallic material in the first step is soaked in the prepared solution of manganese sulfate, kept standing for 8 hours, taken out when bubbles on the metallic material surface are reduced, cleaned with deionized water, and dried; and in the third step, 0.7112 g stearic acid is dissolved in 250 mL anhydrous ethanol to obtain a solution of stearic acid, and the pretreated metallic material with a manganese dioxide coating in the second step is soaked in the solution of stearic acid, taken out after standing for 3 hours, cleaned with anhydrous ethanol, and then dried for 2 hours at 60-80° C. to obtain a super-hydrophobic manganese dioxide coating. It is measured that the obtained super-hydrophobic manganese dioxide coating has a static contact angle of 159.8° and a roll angle of 7.9°.

The static contact angle of the super-hydrophobic manganese dioxide coating in the above embodiments is detected by the following method and device:

the static contact angle of the super-hydrophobic manganese dioxide coating in the above embodiments is detected by a coating contact angle meter (a contact angle meter OCA15EC from Dataphysics, Germany), in accordance with the industrial standards. The detection method belongs to the prior art and is the general knowledge that should be known by a person of ordinary skill in the art. It is not the essential point of the present invention, and will not be explained repeatedly here.

The fabrication process of the super-hydrophobic manganese dioxide coating-coated AZ31B Mg alloy is schematically shown in FIG. 1.

Figure 2A:
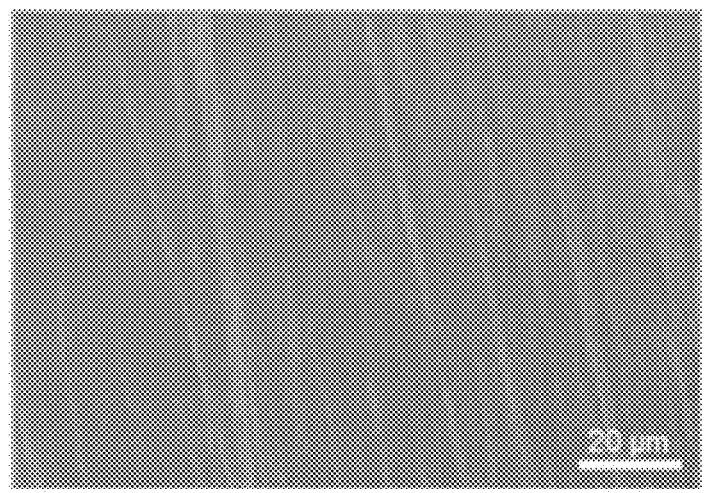
FIGS. 2A-C are scanning electron microscopy (SEM) images of the AZ31B Mg alloy, where 2A: pristine AZ31B Mg alloy; and 2B-C: the super-hydrophobic manganese dioxide coating-coated AZ31B Mg alloy.
Figure 2B:
Figure 2C:
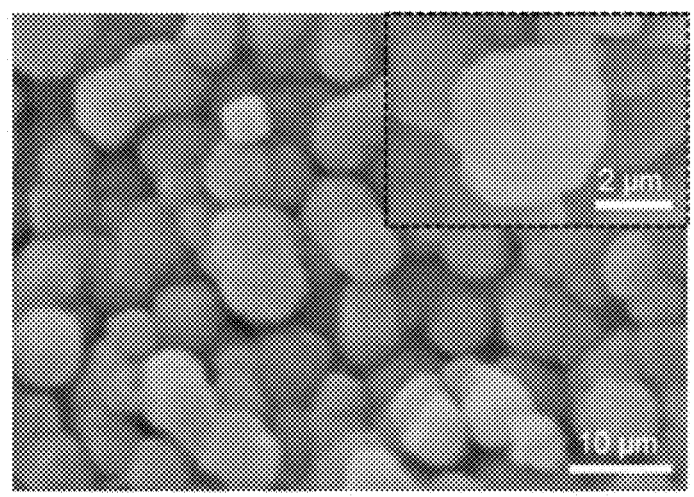

The super-hydrophobic manganese dioxide coating-coated AZ31B Mg alloy prepared in Example 2 is tested by SEM. As shown in FIG. 2A, the SEM image of the pristine AZ31B Mg alloy shows the relatively smooth surface with an array of grinding and polishing lines. After immersion in the MnSO4 solution at room temperature, the Mg alloy surface shows a morphology that includes a sea of spheres aggregating on the substrate (FIG. 2B). The close-up image is shown in FIG. 2C, which demonstrates that the film contained many microspheres with an average diameter of 5 µm stacking on the surface hierarchically, and the space between two spheres is 2 µm approximately. In addition, there are a wealth of fine nanosized structure of cavities and islands on the sphere (FIG. 2C, inset), which could trap a large amount of air facilitating the formation of superhydrophobicity. In this case, cavity and island architectures form on the microsphere, which might be attributed to $H_2$ evolution during the $MnO_2$ coating formation process.

Figure 3A:
FIGS. 3A-B are time-resolved images of water droplet rolling off the super-hydrophobic manganese dioxide coating-coated AZ31B Mg alloy, where 3A: a 9.8 μL water droplet in air; and 3B: a 10.5 μL water droplet in oil (isooctane).
Figure 3B:
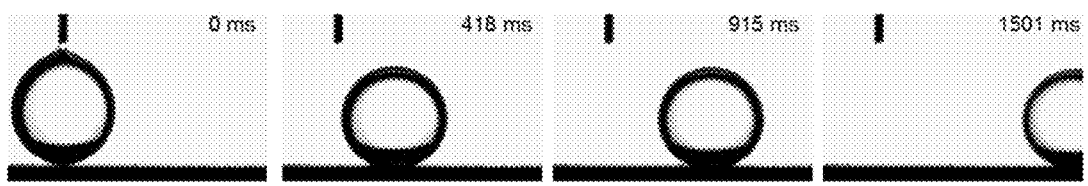
Figure 4A:
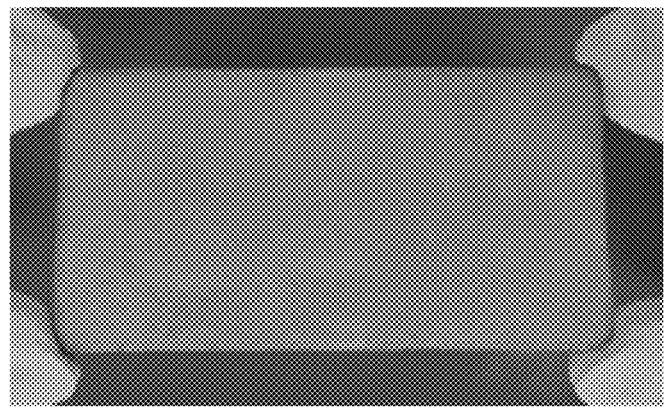
FIGS. 4A-D depict bending and twisting test results of the super-hydrophobic manganese dioxide coating-coated AZ31B Mg alloy, where 4A: before the bending and twisting; 4B: bending in both outward and inward directions; 4C: twisting clockwise and counterclockwise; and 4D: after 100 cycles of the repeated bending and twisting tests.
Figure 4B:
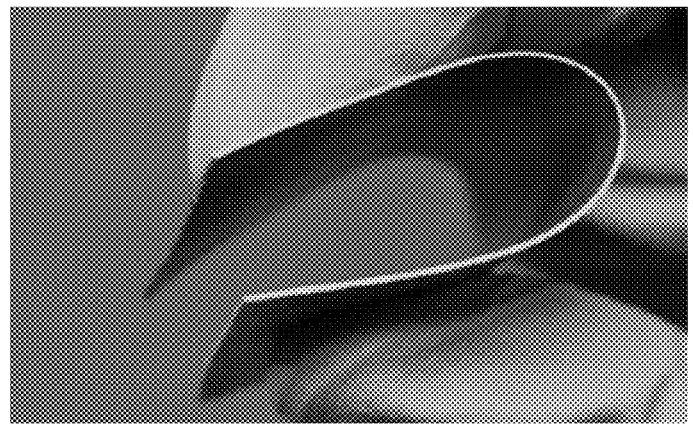
Figure 4C:
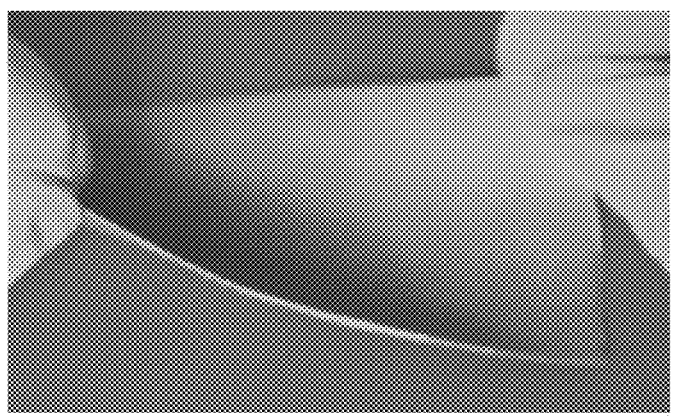
Figure 4D:
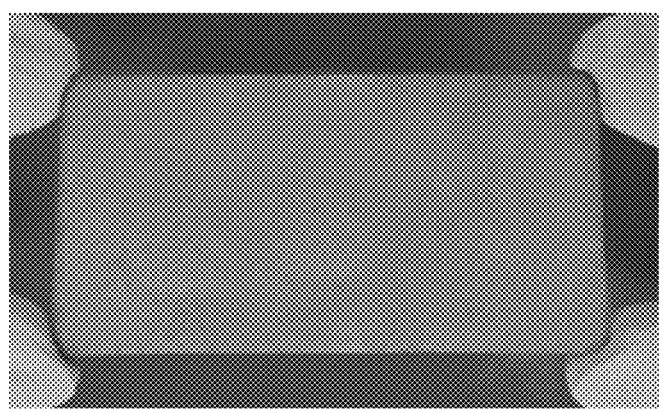

Further, the CA hysteresis on the surface of the super-hydrophobic manganese dioxide coating-coated AZ31B Mg alloy prepared in Example 2 is investigated in air and oil. As illustrated in FIGS. 3A-B, when a water droplet comes into contact with the substrate at a sliding angle of less than 1°, the water droplet quickly slide across and off the substrate within a few seconds in both media, showing ultralow CA hysteresis.

Figure 5:
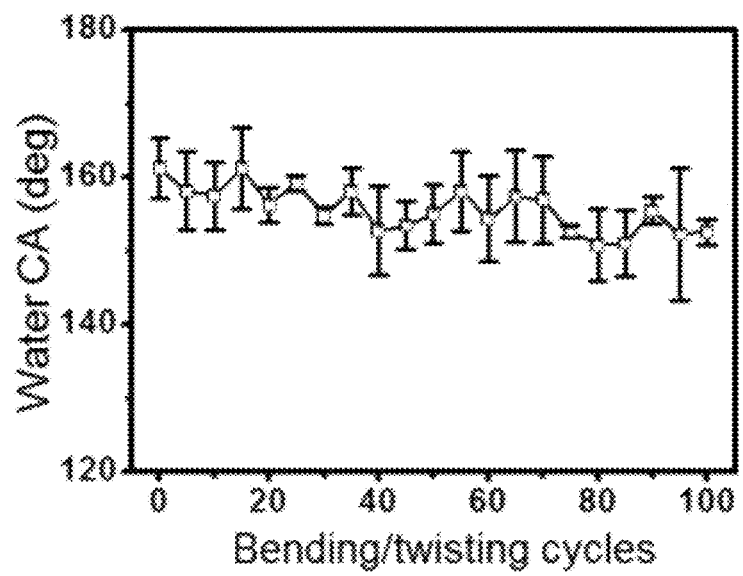
FIG. 5 shows effect of bending/twisting cycle on the water contact angle (CA) of the super-hydrophobic manganese dioxide coating-coated AZ31B Mg alloy.
Figure 6:
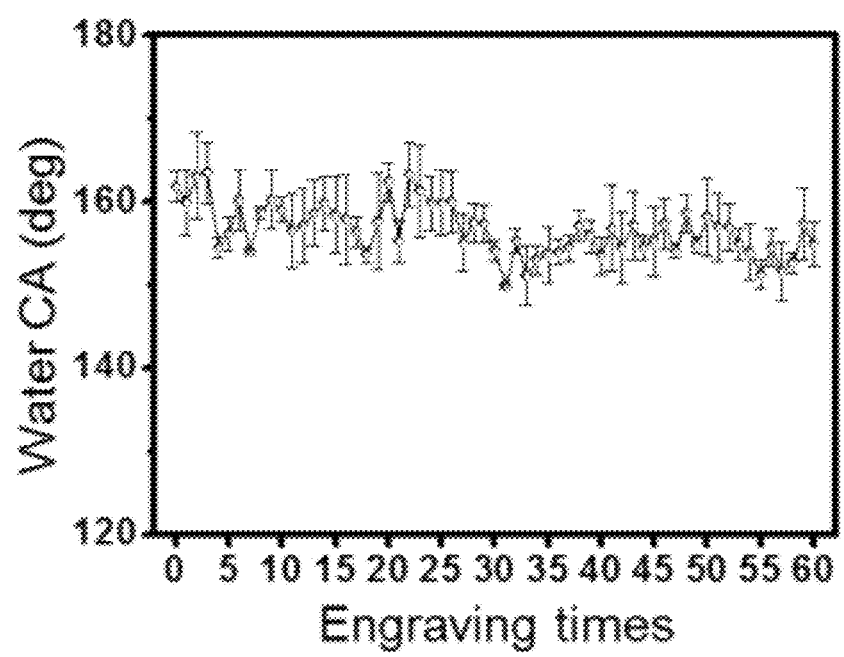
FIG. 6 shows engraving times dependence of static water CAs on the surface of the super-hydrophobic manganese dioxide coating-coated AZ31B Mg alloy.
Figure 7:
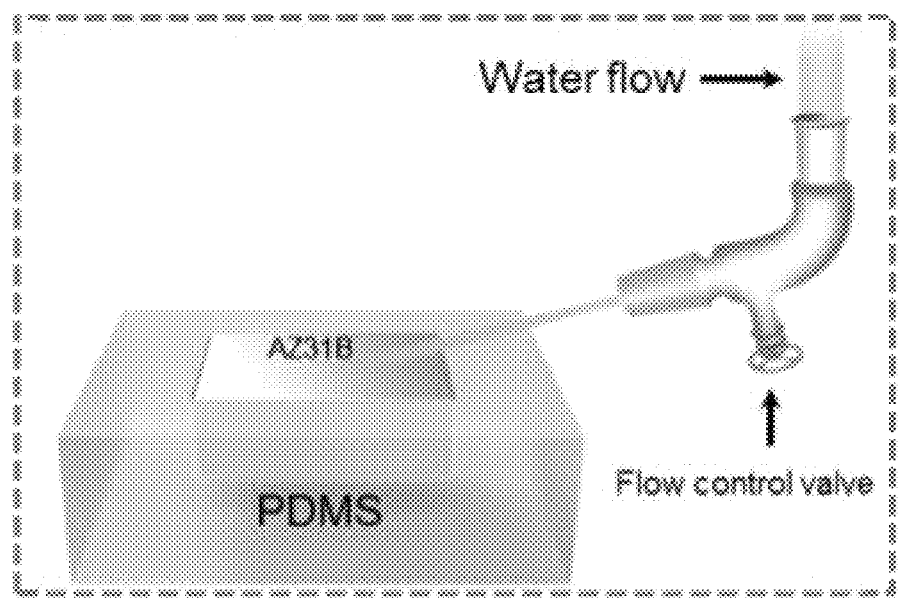
FIG. 7 shows water flow shearing tests for the super-hydrophobic manganese dioxide coating-coated AZ31B Mg alloy.
Figure 8:
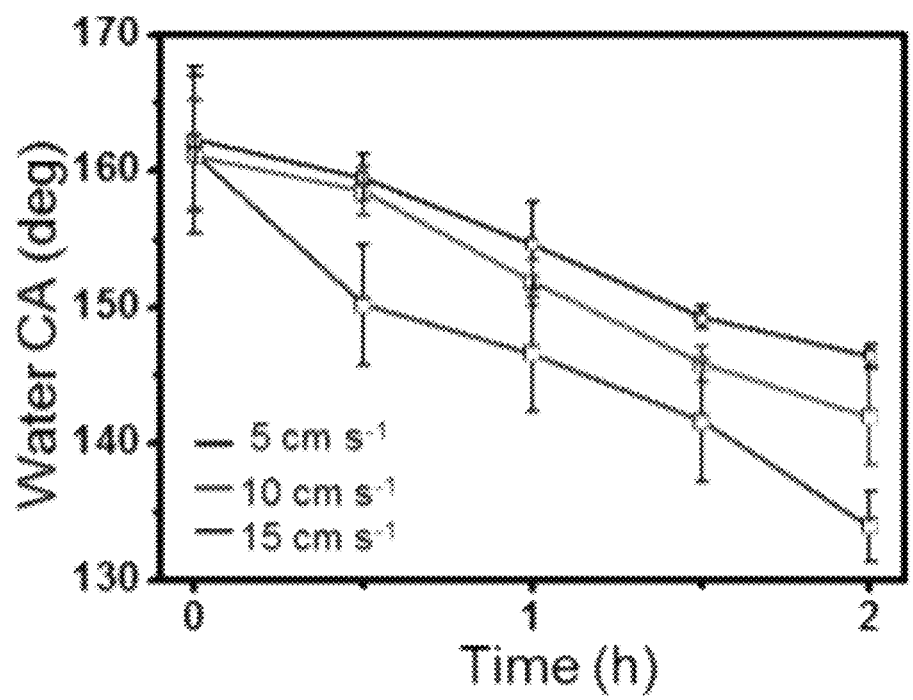
FIG. 8 illustrates effect of the water flow shearing time on the static water CA of the super-hydrophobic manganese dioxide coating-coated AZ31B Mg alloy.

Moreover, the super-hydrophobic manganese dioxide coating-coated AZ31B Mg alloy prepared in Example 2 is also tested for the mechanochemical durability. As shown in FIGS. 4A-D, superhydrophobic samples are repeatedly bent up to an angle of 180° and twisted to an angle of 90°. Based on digital camera images, there are no signs of peeling or exfoliation on the tested surface, free of fracture or crack after 100 repeated bending and twisting cycles. The water CA of the surface in this case is 152.5°±1.7°, hence remaining superhydrophobic (FIG. 5). For ASTM standard (D3359-02) tape tests, cross-hatch engravings are created on superhydrophobic samples at 1 mm spacing using a sharp razor blade, followed by tape application and peel off. According to the results shown in FIG. 6, even after cross-hatch engraving 60 times, the sample still remained superhydrophobic with almost the same water CA greater than 150°. Notably, investigation on the resistance to water flow shear on the superhydrophobic surface for self-cleaning is necessary in practical application. But there are few studies on this issue in the reported literatures. We performed water flow shear tests as shown in FIG. 7. The superhydrophobic MA was fixed in poly-dimethyl siloxane (PDMS), and the superhydrophobic MA was exposed to water. The angle between the water flow and the superhydrophobic MA was 15°. The water flow rate can be changed by flow control valve. In this test, we used three different water flow rates (5 cm s$^{-1}$, 10 cm s$^{-1}$, 15 cm s$^{-1}$) to study the resistance of the superhydrophobic MA to water flow shear. Based on FIG. 8, when the water flowed at 5 cm s$^{-1}$, the superhydrophobic MA remained its superhydrophobicity for 2.0 h. In addition, as the water flow rate increased, the superhydrophobicity remained for decreased time. Meanwhile, when the water flowed at 10 cm s$^{-1}$, and 15 cm s$^{-1}$, the superhydrophobicity remained for 1.5 h, 0.5 h, respectively.

Figure 9:
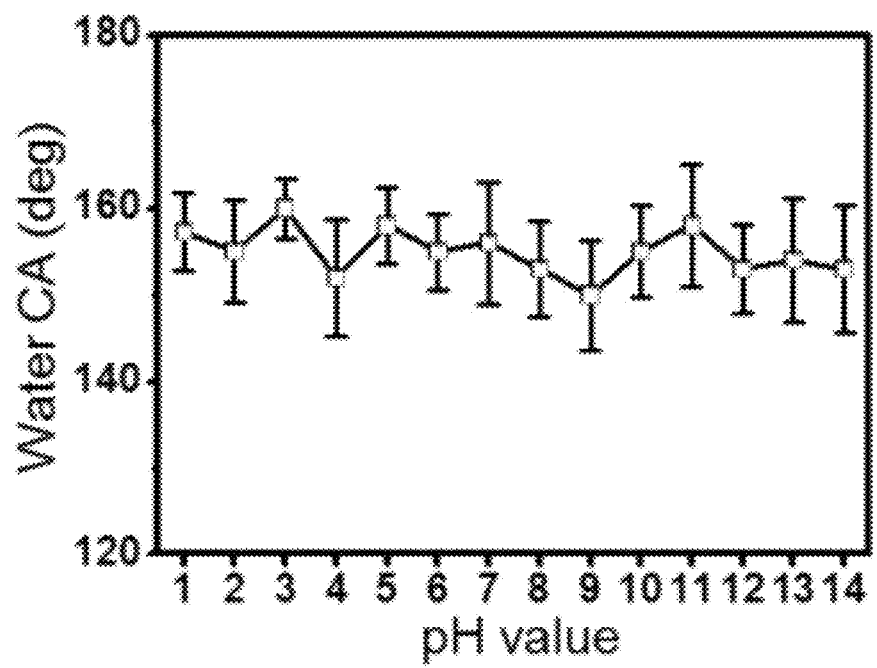
FIG. 9 illustrates effect of the pH on the static water CA of the super-hydrophobic manganese dioxide coating-coated AZ31B Mg alloy.
Figure 10:
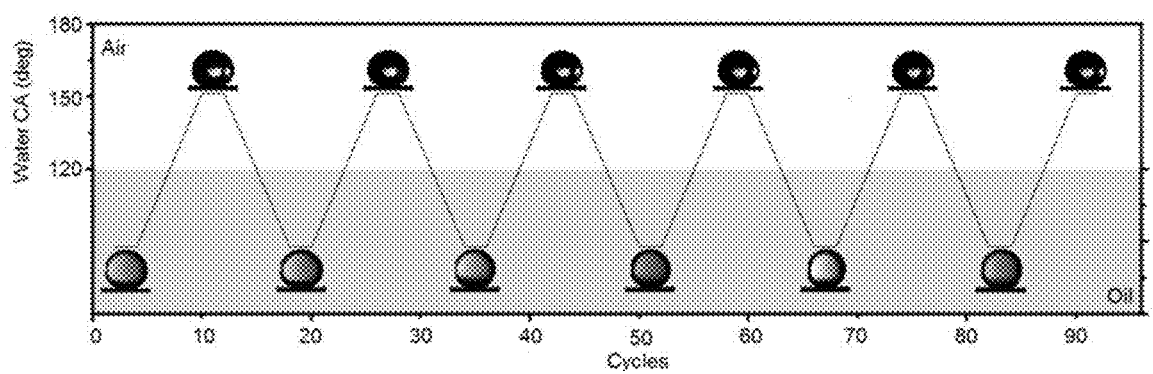
FIG. 10 schematically illustrates the repeatable wettability (static water CA) of the super-hydrophobic manganese dioxide coating-coated AZ31B Mg alloy in air and oil (isooctane).

In addition, sulfuric acid ($H_2SO_4$) and sodium hydroxide (NaOH) were used to tune the pH value of water droplets to investigate the chemical stability of the superhydrophobic MA. FIG. 9 displays the nearly constant water CA over 150° at various pH values (1-14) on the superhydrophobic MA, showing outstanding chemical stability in strongly acidic, strongly basic, and saline environments. It is believed that the surface tension of oil is lower than that of water, when partially contaminated by oil, a superhydrophobic surface normally lose its water repellency resulting from the oil penetrating through the surface. In this regard, we carried out reversible wettability experiments in air and oil to evaluate the stability of the superhydrophobic MA in those media and tested the fatigue resistance to the reversible wettability change. In this context, isooctane was used as oil. According to FIG. 10, the wettability of superhydrophobic MA could be switched from superhydrophobicity (water CA, 160.5°±5.4° in air to improved superhydrophobicity (water CA, 169.1°±2.8° in oil for 90 cycles proving not only favorable stability in air and oil but also good fatigue resistance to the reversible wettability change. This is important for self-cleaning when operated in oil. We attribute the excellent mechanochemical durability of the superhydrophobic MA to the good wear resistance and chemical stability, the micro-nano morphology of the $MnO_2$ coating, and the strong adhesion between film and substrate.

Figure 11A:
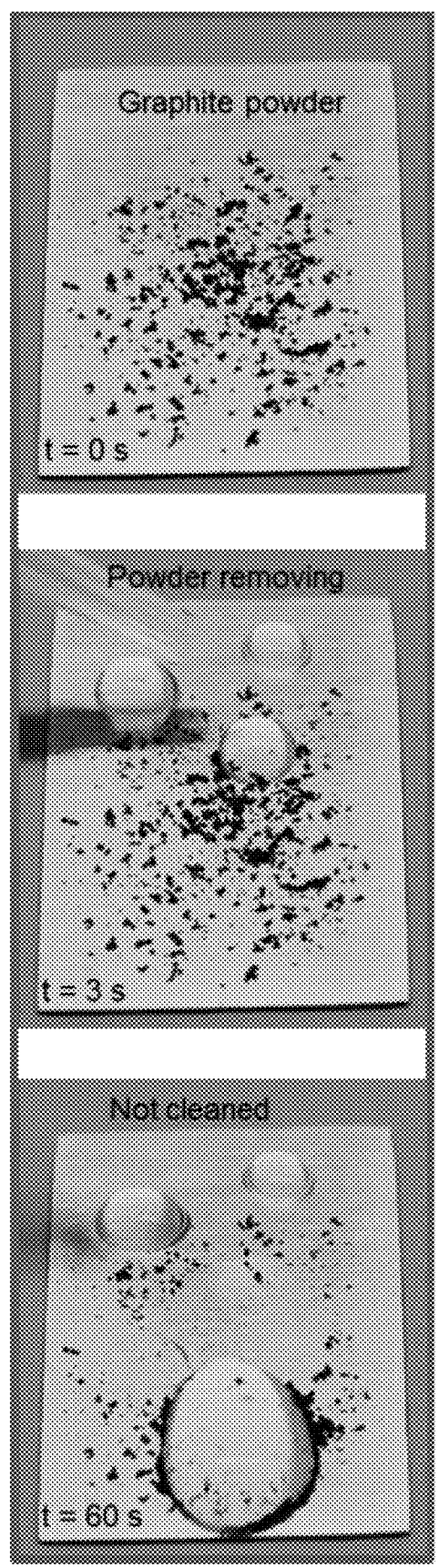
FIGS. 11A-D illustrate self-cleaning tests on the super-hydrophobic manganese dioxide coating-coated AZ31B Mg alloy, where 11A-B: time-sequence images showing pristine AZ31B Mg alloy and Mg alloy surface without self-cleaning properties; and 11C-D: time-sequence images showing self-cleaning properties of the super-hydrophobic manganese dioxide coating-coated AZ31B Mg alloy in air (C) and oil (D).
Figure 11B:
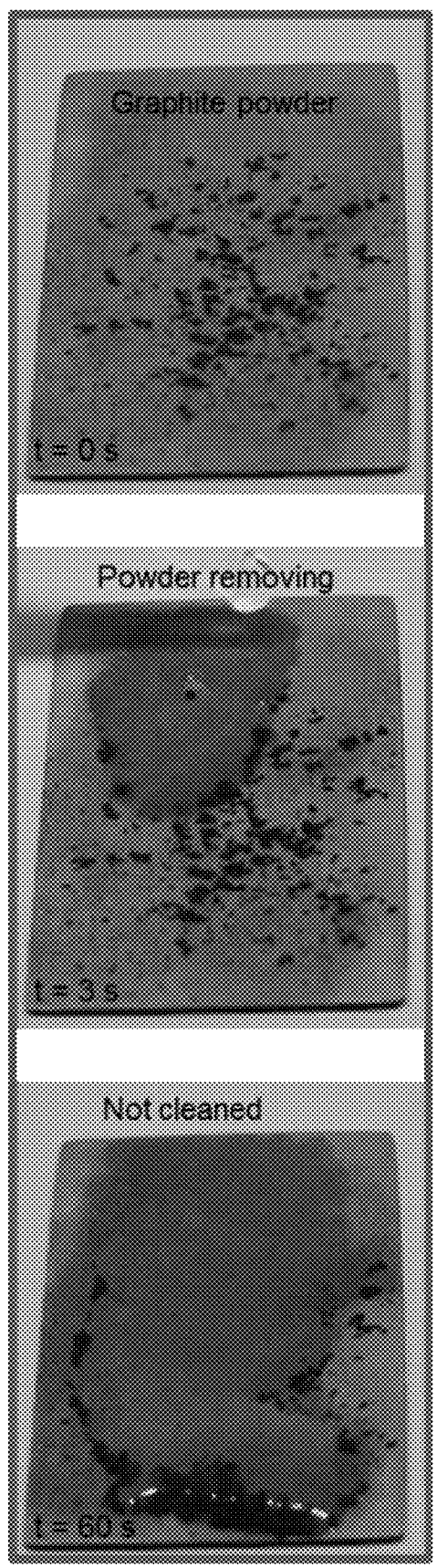
Figure 11C:
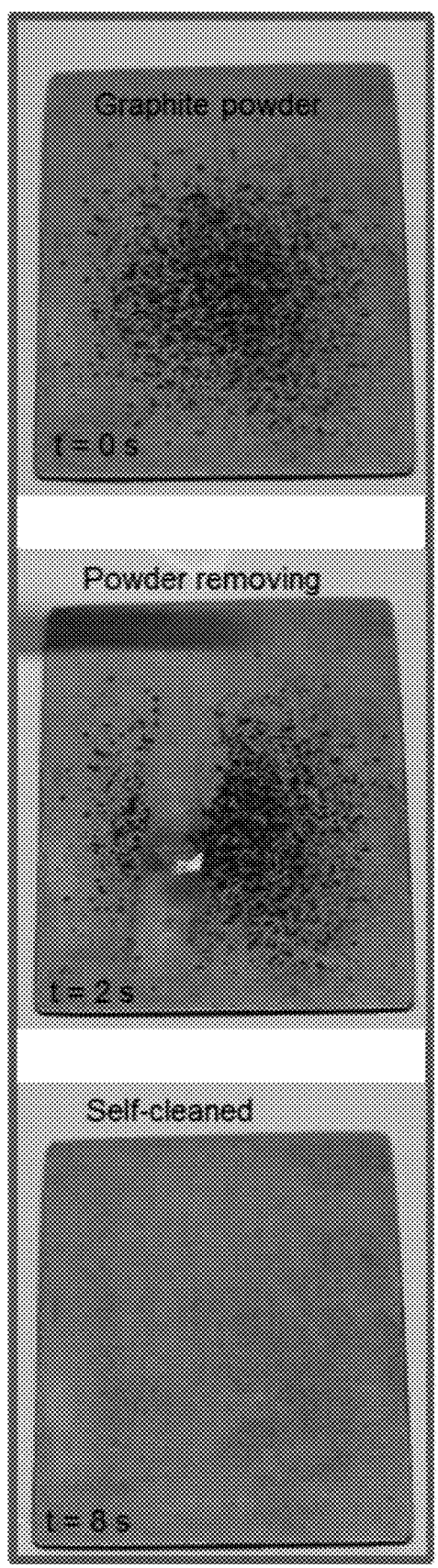
Figure 11D:
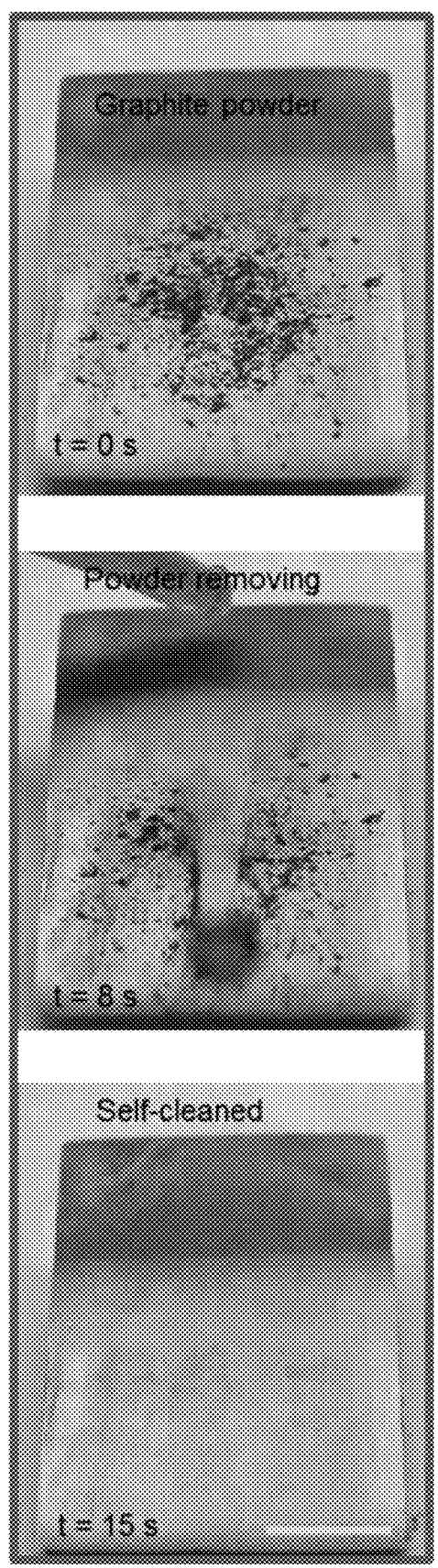

The super-hydrophobic manganese dioxide coating-coated AZ31B Mg alloy prepared in Example 2 is further tested for the self-cleaning ability. As shown in FIG. 11A, graphite powder was randomly distributed on the pristine AZ31B Mg alloy specimen. Then, the surface was tilted by less than 1° and a dropper pipette was used to release water droplets from a distance extremely close to the surface. Most of the powder rested on the surface even though the volume of the water droplet was so large (bottom image in FIG. 11A), and the similar tendency was observed on the MA surface (FIG. 11B). FIG. 11C displays nearly complete cleaning along the rolling-off path for the droplets, and the graphite powder was removed by water droplets in several seconds easily: notably, the superhydrophobic MA sample showed self-cleaning property even in oil (such as isooctane) (FIG. 11D). These results indicate that our designed superhydrophobic MA surfaces can be used for self-cleaning in air and oil ascribed to the water repellence as well as the ultralow CA hysteresis.

The above embodiments are merely preferred implementations of the present disclosure and not intended to limit the scope of the present disclosure. Various variations and improvements made by a person of ordinary skill in the art without departing from the spirit of the disclosure shall fall into the scope of the present disclosure defined by the appended claims.

What is claimed is:

1. A super-hydrophobic manganese dioxide coating on a surface of a metallic material, comprising:
    manganese dioxide microspheres; and
    a stearic acid shell;
    wherein the manganese dioxide microspheres are encased in the stearic acid shell;
    the manganese dioxide microspheres are stacked hierarchically on the metallic material surface; and
    nanosized cavities and islands are formed on the manganese dioxide microspheres.

2. The super-hydrophobic manganese dioxide coating of claim 1, wherein an average diameter of the manganese dioxide microspheres is 3-7 μm, and a space between two adjacent manganese dioxide microspheres is 1.5-2.5 μm.

3. The super-hydrophobic manganese dioxide coating of claim 1, wherein the super-hydrophobic manganese dioxide coating has a thickness of 80-90 μm.

4. The super-hydrophobic manganese dioxide coating of claim 1, wherein the super-hydrophobic manganese dioxide coating is prepared through steps of:
    (1) soaking the metallic material in a water-soluble manganese salt solution followed by clean and drying to obtain a manganese dioxide coating on the metallic material; and
    (2) dissolving stearic acid in an organic solvent to obtain a stearic acid solution; and soaking the treated metallic material in the step (1) in the stearic acid solution followed by cleaning and drying to obtain the super-hydrophobic manganese dioxide coating on the surface of the metallic material.

5. The super-hydrophobic manganese dioxide coating of claim 4, wherein the water-soluble manganese salt is manganese sulfate; the water-soluble manganese salt solution has a concentration of 0.01-0.1 mol/L; and the organic solvent is anhydrous ethanol.

\* \* \* \* \*